US012732681B2

(12) United States Patent
Duan et al.

(10) Patent No.: US 12,732,681 B2
(45) Date of Patent: Sep. 8, 2026

(54) GIMBAL MODULE AND ELECTRONIC DEVICE

(71) Applicant: TRIPLE WIN TECHNOLOGY(SHENZHEN) CO.LTD., Shenzhen (CN)

(72) Inventors: Wang-Wei Duan, Jincheng (CN); Sheng-Kai Tian, Jincheng (CN); Xiang Wang, Jincheng (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 341 days.

(21) Appl. No.: 18/522,556

(22) Filed: Nov. 29, 2023

(65) Prior Publication Data

US 2024/0305874 A1 Sep. 12, 2024

(30) Foreign Application Priority Data

Mar. 10, 2023 (CN) ......................... 202320463396.8

(51) Int. Cl.
*H04N 23/55* (2023.01)
*G02B 7/02* (2021.01)

(52) U.S. Cl.
CPC ............... *H04N 23/55* (2023.01); *G02B 7/02* (2013.01)

(58) Field of Classification Search
CPC ........ H04N 23/55; H04N 23/00; H04N 23/54; G02B 7/02
USPC .......................................................... 359/819
See application file for complete search history.

(56) References Cited

U.S. PATENT DOCUMENTS

| | | | | |
|---|---|---|---|---|
| 2011/0150442 | A1* | 6/2011 | Ollila | H04N 23/54 359/557 |
| 2021/0132407 | A1* | 5/2021 | Minamisawa | G02B 7/02 |
| 2022/0019087 | A1* | 1/2022 | Minamisawa | G03B 5/06 |
| 2023/0336855 | A1* | 10/2023 | Li | H04N 23/51 |
| 2023/0336857 | A1* | 10/2023 | Li | H04N 23/57 |
| 2024/0048846 | A1* | 2/2024 | Yang | H04N 23/54 |
| 2025/0386100 | A1* | 12/2025 | Park | G03B 5/00 |

* cited by examiner

*Primary Examiner* — Bumsuk Won
*Assistant Examiner* — Seth D Moser
(74) *Attorney, Agent, or Firm* — ScienBiziP, P.C.

(57) ABSTRACT

A gimbal module includes a first carrier including a receiving chamber, a first bracket accommodated in the receiving chamber, a lens assembly fixed to the first bracket, and a flexible circuit board connected to the lens assembly. The flexible circuit board extends in an S-shape on a plane as viewed in a height direction of the gimbal module. An electronic device including the gimbal module is also disclosed.

14 Claims, 4 Drawing Sheets

GIMBAL MODULE AND ELECTRONIC DEVICE

FIELD

The subject matter herein generally relates to the field of camera technologies, and in particular, to a gimbal and an electronic device including the gimbal.

BACKGROUND

As a user has an increasingly high shooting requirement on an electronic device, a requirement on image stabilization performance of a camera module is also stricter. Currently, the camera module includes a lens assembly and a gimbal. The lens assembly is installed on the gimbal, and the gimbal drives the lens assembly to move, to compensate for shake of the camera module, thereby implementing optical image stabilization.

BRIEF DESCRIPTION OF THE DRAWINGS

Implementations of the present technology will now be described, by way of embodiment, with reference to the attached figures.

DETAILED DESCRIPTION

Figure 1:
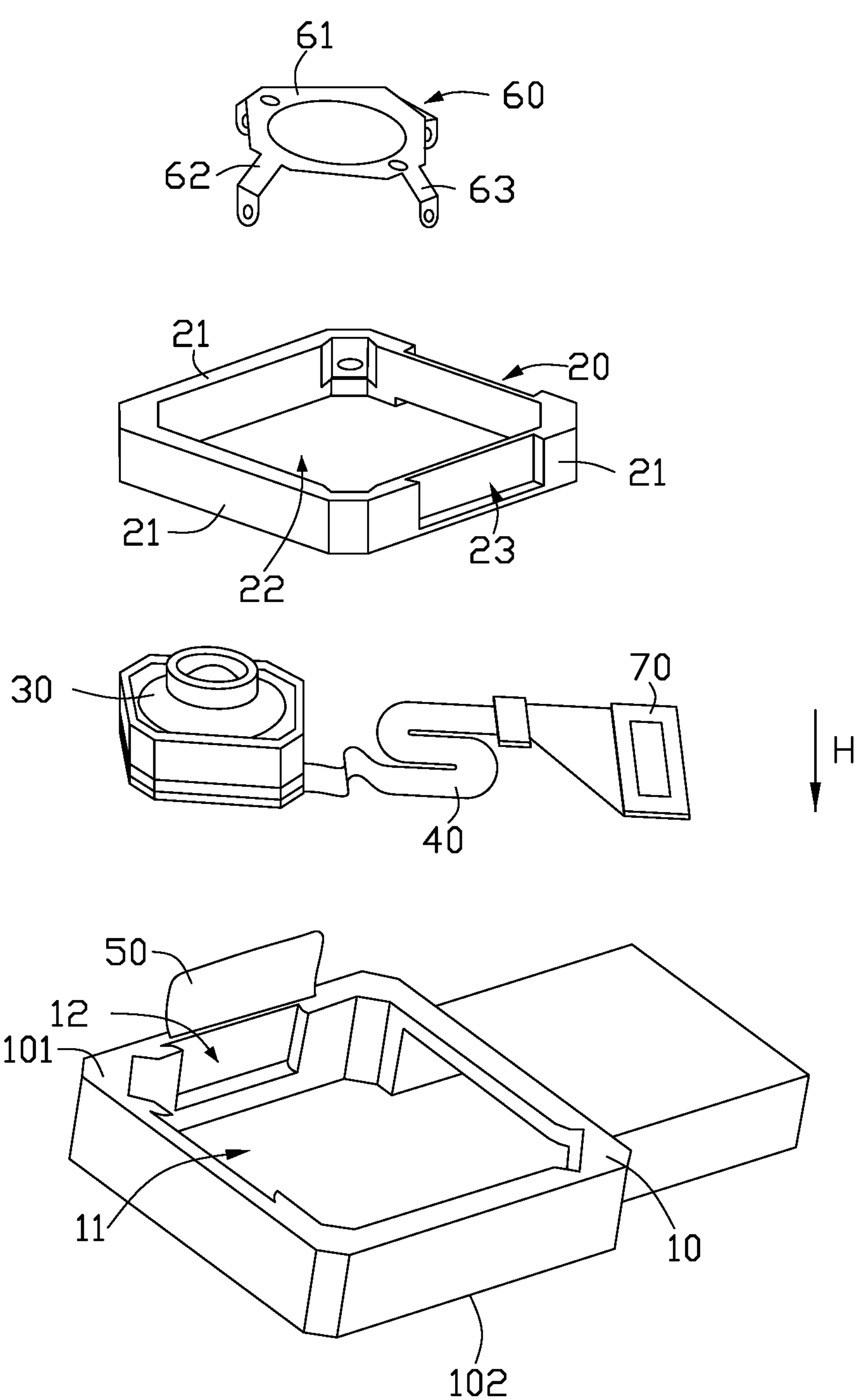
FIG. 1 is an exploded view illustrating a gimbal module according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "connected" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 2:
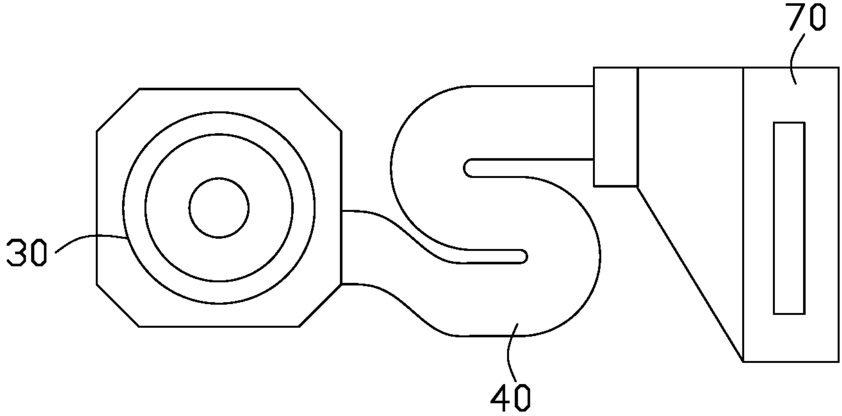
FIG. 2 is a top view illustrating a lens assembly, a flexible circuit board, and a connector of the gimbal module in FIG. 1.

Referring to FIG. 1, an embodiment of a gimbal module 100 is illustrated. The gimbal module 100 includes a first carrier 10, a first bracket 20, a lens assembly 30, and a flexible circuit board 40. The first carrier 10 defines a receiving chamber 11. The first bracket 20 is accommodated in the receiving chamber 11. The lens assembly 30 is fixed to the first bracket 20. The flexible circuit board 40 is connected to the lens assembly 30. Referring to FIG. 1 and FIG. 2, on a plane as viewed in a height direction H of the gimbal module 100, the flexible circuit board 40 extends in an S-shape.

In the case where the flexible circuit board 40 is arranged to extend in an S-shape on a plane perpendicular to the height direction H, there is an air gap in the flexible circuit board 40. When the lens assembly 30 in the gimbal module 100 moves to compensate for shake of the gimbal module 100, the flexible circuit board 40 which is S-shaped on plane can effectively counteract the twisting and pulling force during movement, improving optical image stabilization.

Referring to FIG. 1, the first bracket 20 is substantially a hollow rectangular frame, the first bracket 20 includes a plurality of side walls 21 which are connected in an order. The plurality of side walls 21 enclose an accommodation space, and the lens assembly 30 is fixed in the accommodation space. At least one side wall 21 defines a first groove 23. Specifically, an outer surface of one side wall 21 is concaved inward to form the first groove 23, and the first groove 23 penetrates through two adjacent surfaces which are perpendicular to each other. The gimbal module 100 further includes a coil (not shown), and the coil is disposed in the first groove 23.

Referring to FIG. 1, an inner surface of the receiving chamber 11 defines a second groove 12. Specifically, the inner surface of the receiving chamber 11 is concaved inward to form the second groove 12. The second groove 12 corresponds in position to the first groove 11. The gimbal module 100 further includes a magnetic member (not shown), and the magnetic member is disposed in the second groove 12. The magnetic member in the second groove 12 corresponds in position to the coil in the first groove 23, the magnetic member can drive the energized coil through magnetic field force to drive the lens assembly 30 fixed on the first bracket 20 to move. The magnetic member can be, but is not limited to, a magnet.

The first carrier 10 includes a top surface 101 and a bottom surface 102 opposite to the top surface 101. The top surface 101 is concaved towards the bottom surface to form the receiving chamber 11. The second groove 12 penetrates through the top surface 101. The gimbal module 100 further includes a magnet yoke 50. The magnet yoke 50 is disposed on the top surface 101 and corresponds in position to the magnetic member in the second groove 12. The magnet yoke 50 covers the second groove 12. The magnet yoke 50 itself does not produce a magnetic field (magnetic lines of force) and plays a role in the transmission of magnetic lines of force in a magnetic circuit. In addition, the magnetic yoke 50 can also act as a shield against external magnetic fields, avoiding interference with the coil caused by external magnetic fields.

Referring to FIG. 1, the gimbal module 100 further includes a second bracket 60. The second bracket 60 is disposed on a side of the lens assembly 30 facing away from the first carrier 10. The second bracket 60 includes a main body 61, a first engaging part 62, and a second engaging part 63. The first engaging part 62 and the second engaging part 63 extend from the main body 61 in the same direction. The first engaging part 62 is clamped between the first carrier 10 and the first bracket 20. The second engaging part 63 is clamped between the first bracket 20 and the lens assembly 30. The second bracket 60 is a metal spring sheet. When the coil on the first bracket 20 is powered off, the lens assembly 30 is restored by an elastic force of the second bracket 60.

Referring to FIG. 1, the gimbal module 100 further includes a connector 70. The connector 70 is electrically connected to the flexible circuit board 40. The connector 70 is configured to implement signal transmission between the gimbal module 100 and an electronic device 200 (see FIG. 4).

Figure 3:
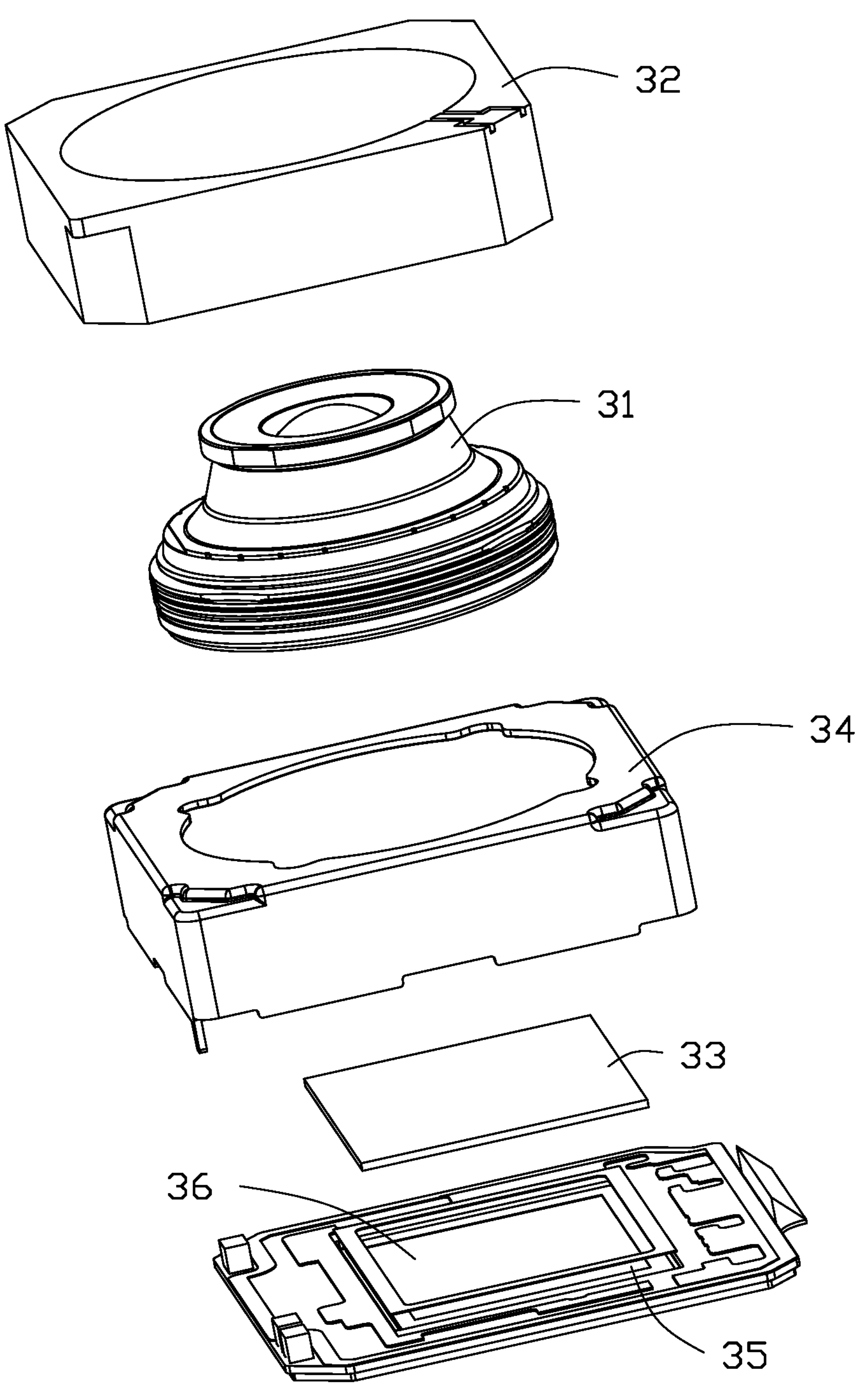
FIG. 3 is an exploded view illustrating the lens assembly of the gimbal module in FIG. 1.

Referring to FIG. 3, the lens assembly 30 includes a lens 31, a lens holder 32 holding the lens 31, an optical filter 33, a second carrier 34, and a printed circuit board 35. The lens holder 32 and the second carrier 34 each are hollow and rectangular. The lens holder 32 and the optical filter 33 are disposed on opposite surfaces of the second carrier 34 through adhesives. The optical filter 33 is on an optical path of lens 31. The optical filter 33 is used to filter out infrared light, ensuring imaging quality. The second carrier 34 is disposed on a surface of the printed circuit board 35 through adhesive. The printed circuit board 35 is a hard board and electrically connected to the flexible circuit board 40.

Referring to FIG. 3, the lens assembly 30 further includes an image sensor 36. The image sensor 36 is disposed on a surface of the printed circuit board 35 facing the second carrier 34. The image sensor 36 is aligned with the optical filter 33. The optical filter 33 is located between the lens 31 and the image sensor 36.

Figure 4:
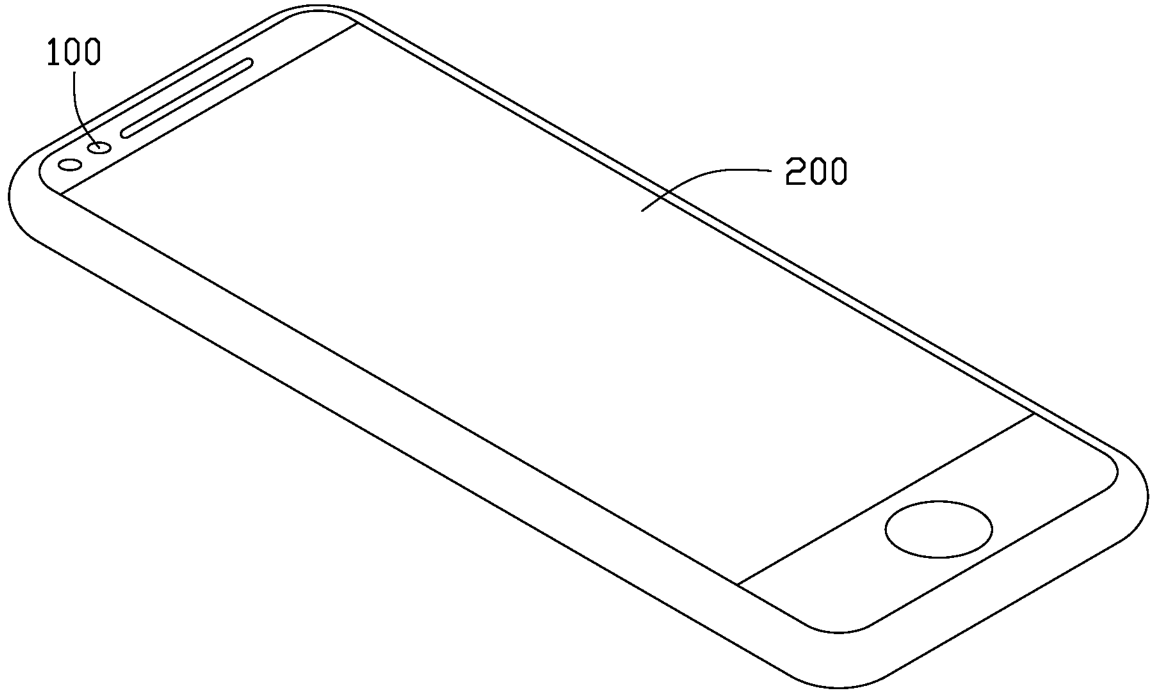
FIG. 4 is a schematic view illustrating an electronic device according to an embodiment of the present disclosure.

FIG. 4 illustrates an embodiment of an electronic device 200. The electronic device 200 includes the gimbal module 100. The electronic device 200 can be any electronic device having imaging capturing functions, such as mobile phones, wearable devices, computer devices, vehicles, or monitoring devices. In an alternative embodiment, the electronic device 200 is a mobile phone.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A gimbal module comprising:
- a first carrier comprising a receiving chamber;
- a first bracket accommodated in the receiving chamber;
- a lens assembly fixed to the first bracket; and
- a flexible circuit board connected to the lens assembly, wherein the flexible circuit board extends in an S-shape on a plane as viewed in a height direction of the gimbal module;
- wherein the first bracket comprises a plurality of side walls, the plurality of side walls is connected and encloses an accommodation space, the lens assembly is fixed in the accommodation space, and an outer surface of one of the plurality of side walls defines a first groove which is configured for holding a coil;
- wherein an inner surface of the receiving chamber defines a second groove which is configured for holding a magnetic member, the second groove corresponds in position to the first groove, the first carrier comprises a top surface and a bottom surface, the top surface is concaved towards the bottom surface to form the receiving chamber, the gimbal module further comprises a magnet yoke, and the magnet yoke is disposed on the top surface and corresponds in position to the second groove.

2. The gimbal module of claim 1, wherein the second groove penetrates through the top surface, the magnet yoke covers the second groove.

3. The gimbal module of claim 1, further comprising a second bracket disposed on a side of the lens assembly facing away from the first carrier, wherein the second bracket comprises a main body, a first engaging part, and a second engaging part, the first engaging part and the second engaging part extend from the main body in the same direction, the first engaging part is clamped between the first carrier and the first bracket, and the second engaging part is clamped between the first bracket and the lens assembly.

4. The gimbal module of claim 3, wherein the second bracket is a metal spring sheet.

5. The gimbal module of claim 1, further comprising a connector, wherein the connector is electrically connected to the flexible circuit board.

6. The gimbal module of claim 1, wherein the lens assembly comprises a lens, a lens holder holding the lens, an optical filter, a second carrier, and a printed circuit board, the lens holder and the optical filter are disposed on the second carrier, the second carrier is disposed on the printed circuit board, and the printed circuit board is electrically connected to the flexible circuit board.

7. The gimbal module of claim 6, wherein the lens assembly further comprises an image sensor, the image sensor is disposed on a surface of the printed circuit board facing the second carrier and is aligned with the optical filter.

8. An electronic device comprising a gimbal module, the gimbal module comprising:
- a first carrier comprising a receiving chamber;
- a first bracket accommodated in the receiving chamber;
- a lens assembly fixed to the first bracket; and
- a flexible circuit board connected to the lens assembly, wherein the flexible circuit board extends in an S-shape on a plane as viewed in a height direction of the gimbal module;
- wherein the first bracket comprises a plurality of side walls, the plurality of side walls is connected and encloses an accommodation space, the lens assembly is fixed in the accommodation space, and an outer surface of one of the plurality of side walls defines a first groove which is configured for holding a coil;
- wherein an inner surface of the receiving chamber defines a second groove which is configured for holding a magnetic member, the second groove corresponds in position to the first groove, the first carrier comprises a top surface and a bottom surface, the top surface is concaved towards the bottom surface to form the receiving chamber, the gimbal module further comprises a magnet yoke, and the magnet yoke is disposed on the top surface and corresponds in position to the second groove.

9. The electronic device of claim 8, wherein the second groove penetrates through the top surface, the magnet yoke covers the second groove.

10. The electronic device of claim 8, wherein the gimbal module further comprises a second bracket disposed on a side of the lens assembly facing away from the first carrier, the second bracket comprises a main body, a first engaging part, and a second engaging part, the first engaging part and the second engaging part extend from the main body in the same direction, the first engaging part is clamped between the first carrier and the first bracket, and the second engaging part is clamped between the first bracket and the lens assembly.

11. The electronic device of claim 10, wherein the second bracket is a metal spring sheet.

12. The electronic device of claim 8, wherein the gimbal module further comprises a connector, the connector is electrically connected to the flexible circuit board.

13. The electronic device of claim 8, wherein the lens assembly comprises a lens, a lens holder holding the lens, an optical filter, a second carrier, and a printed circuit board, the lens holder and the optical filter are disposed on the second carrier, the second carrier is disposed on the printed circuit board, and the printed circuit board is electrically connected to the flexible circuit board.

14. The electronic device of claim 13, wherein the lens assembly further comprises an image sensor, the image sensor is disposed on a surface of the printed circuit board facing the second carrier and is aligned with the optical filter.

* * * * *